US007516331B2

(12) United States Patent
Jin et al.

(10) Patent No.: US 7,516,331 B2
(45) Date of Patent: Apr. 7, 2009

(54) TAMPER-RESISTANT TRUSTED JAVA VIRTUAL MACHINE AND METHOD OF USING THE SAME

(75) Inventors: Hongxia Jin, Cupertino, CA (US); Donald E. Leake, Jr., Vestal, NY (US); Jeffrey B. Lotspiech, Henderson, NV (US); Sigfredo I. Nin, Morgan Hill, CA (US); Wilfred E. Plouffe, San Jose, CA (US)

(73) Assignee: International Business Machines Corporation, Armonk, NY (US)

( * ) Notice: Subject to any disclaimer, the term of this patent is extended or adjusted under 35 U.S.C. 154(b) by 797 days.

(21) Appl. No.: 10/723,725

(22) Filed: Nov. 26, 2003

(65) Prior Publication Data

US 2005/0114683 A1    May 26, 2005

(51) Int. Cl.
*H04L 9/32* (2006.01)
(52) U.S. Cl. .................. 713/187; 713/194; 717/148; 717/118
(58) Field of Classification Search ............. 713/187, 713/194
See application file for complete search history.

(56) References Cited

U.S. PATENT DOCUMENTS

| 5,692,047 | A | 11/1997 | McManis .................. 380/4 |
| 5,917,912 | A | 6/1999 | Ginter et al. ............. 713/187 |
| 5,920,861 | A | 7/1999 | Hall et al. .................. 707/9 |
| 5,940,513 | A | 8/1999 | Aucsmith et al. |
| 6,067,575 | A | 5/2000 | McManis et al. .......... 709/300 |
| 6,092,147 | A * | 7/2000 | Levy et al. ................. 711/6 |
| 2002/0147763 | A1 * | 10/2002 | Lee et al. .................. 709/202 |
| 2002/0184520 | A1 | 12/2002 | Bush |
| 2002/0194482 | A1 | 12/2002 | Griffin et al. ............. 713/716 |

(Continued)

FOREIGN PATENT DOCUMENTS

EP    0875814    11/1998

(Continued)

OTHER PUBLICATIONS

Scott Oaks "Java security" May 2001 O'Reilly, Sebastopol, CA95472, XP002321663, p. 261-275.*

(Continued)

*Primary Examiner*—Nasser G Moazzami
*Assistant Examiner*—Fikremariam Yalew
(74) *Attorney, Agent, or Firm*—Cantor Colburn LLP; Leonard Guzman

(57) ABSTRACT

A trusted Java virtual machine provides a method for supporting tamper-resistant applications, ensuring the integrity of an application and its secrets such as keys. The trusted Java virtual machine verifies the integrity of the Java application, prevents debugging of the Java application, and allows the Java application to securely store and retrieve secrets. The trusted Java virtual machine environment comprises a TrustedDictionary, a TrustedBundle, an optional encryption method for encrypting and decrypting byte codes, and an underlying trusted Java virtual machine. The encrypted TrustedDictionary protects data while the TrustedBundle protects programming code, allowing applications to store secret data and secure counters. The application designer can restrict TrustedBundle access to only those interfaces that the application designer explicitly exports. The open source code may optionally be encrypted. Secrets required by the open source programming code of the application are encrypted in TrustedDictionary.

33 Claims, 5 Drawing Sheets

U.S. PATENT DOCUMENTS

| | | |
|---|---|---|
| 2002/0199100 A1 | 12/2002 | Nenashev |
| 2003/0074567 A1 | 4/2003 | Charbonneau |
| 2003/0135746 A1 | 7/2003 | Abbott |
| 2005/0204126 A1* | 9/2005 | Watson ........................ 713/150 |

FOREIGN PATENT DOCUMENTS

| | | |
|---|---|---|
| WO | PCT/EP2004/052884 | 4/2005 |
| WO | PCT/EP2004/052884 | 6/2005 |

OTHER PUBLICATIONS

Scott Oaks "Java security" May 2001 O'Reilly, Seabatopol, CA 95472, XP002321663, pp. 261-275.*

Scott Oaks: "Java Security", May 2001, O'Reilly, Sebastopol, CA 95472, XP002321663, pp. 261-287 and 309-310.

"Java(TM) Platform Debugger Architecture—Architecture Overview," retrieved from the following url: http://java.sun.com/j2se/1.3/docs/guide/jpda/architecture.html, on Aug. 11, 2006.

"Java(TM) Platform Debugger Architecture—Overview," retrieved from the following url:http://java.sun.com/j2se/1.5.0/docs/guide/jpda/jpda.html, on Aug. 11, 2006.

Dan Wallach et al., "Extensible Security Architectures for Java," ACM 1997.

Proceedings of the Sixth International Conference on Computer Supported Cooperative Work in Design, Jul. 12-14, 2001, London, Ontario, Canada, pp. 330-337.

Extensible security architectures for Java, available on Jul. 2, 2003, at: http://portal.acm.org/citation.cfm?id=266668&coll=ACM&dl=ACM&CFID=11120545&CFT( . . . .

Mat Bishop, "Analyzing the Security of an Existing Computer System," IEEE 1986.

* cited by examiner

TAMPER-RESISTANT TRUSTED JAVA VIRTUAL MACHINE AND METHOD OF USING THE SAME

FIELD OF THE INVENTION

The present invention generally relates to applications running on virtual computing machines. More specifically, the present invention pertains to applications running in a trusted environment that provides a method for making the application tamper-resistant.

BACKGROUND OF THE INVENTION

The entertainment industry is in the midst of a digital revolution. Music, television, and movies are increasingly becoming digital, offering new advantages to the consumer in quality and flexibility. At the same time, since digital data can be perfectly and quickly copied, the digital revolution also comprises a threat. If consumers may freely copy entertainment content and offer that content on the Internet, the market for entertainment content may evaporate.

Content protection schemes have been devised to lessen the threat, such as Digital Rights Management (DRM) systems, Content Scrambling System (CSS) for DVD video, and Content Protection for Prerecorded Media (CPPM) for DVD audio, among many others. These systems share the following feature: the software that implements them is required to be "robust," that is the software resists attacks by hackers, either to extract the secrets (keys) from the software or to modify the software's behavior to get unauthorized functionality. Technologies that resist such attacks are called tamper-resistant software.

A common perception is that tamper-resistant software conflicts with the concept of "open source" on the premise that a hacker may more easily compromise an open source program. However, an open source content protection scheme presents definite advantages. Open standards may prevent fragmentation of the market and forestall proprietary solutions from locking out competition. In addition, an open source content protection scheme may actually help reduce the level of hacker attacks. The well-known break to the DVD video CSS scheme was enabled, in no small part, by leaks from insiders. These insiders were apparently motivated by the desire to have a DVD player on the open-source platform Linux.

Meanwhile, the Java® language has replaced the computer language C for many applications. The Java language is implemented by converting a source program to instructions (called byte codes) of a hypothetical computer referred to as the Java Virtual Machine, or Java virtual machine ("JVM").

The Java virtual machine is not an actual hardware computer, instead it is a program that interprets the byte codes, and implements their functions on a given physical computer. This approach has given Java portability; the language is available in all types of computers and even in embedded devices such as cell phones, stereos, and TV set-top boxes.

Several companies have produced computers whose instruction set is the same as the Java virtual machine. In such a case, the Java virtual machine is real, not virtual. However, by convention, such a real computer is still called a "Java virtual machine", a practice we will follow in the description of our invention.

One approach to content protection uses a Java virtual machine to implement the robustness requirements of content protection schemes. In this approach, all secret data and algorithms are not implemented in Java; instead, they are "wired in" to the Java virtual machine itself. Furthermore, the Java virtual machine provides a "sand box" environment so that unauthorized actions are prevented. For example, when the Java virtual machine is dealing with protected content, the normal file-writing mechanism of Java is disabled. Advantageously, there is no need to verify the integrity of the Java code itself.

This "sandbox" prevents any unauthorized behavior by the Java code. The important logic of each content protection scheme is hidden in the tamper resistant environment in the Java virtual machine itself. Although this technology has proven to be useful, it is desirable to present a solution where the secret data and algorithms do not need to be implemented in the Java virtual machine, they can be implemented in Java. Such a solution has the additional advantage that it can support the "open source" concept.

Most content protection applications involve secret data (keys) as opposed to secret algorithms. Some content protection schemes, such as watermarking schemes, also involve secret algorithms. It is relatively easy for hackers to deduce the original Java program from the byte codes. Traditional "byte-code obfuscation" programs actually do little to prevent this, merely obfuscating the names of variables, methods, and classes. What is needed is a solution that comprises strong cryptographic protection for the byte codes, if necessary.

Some content protection schemes utilize a "secure counter". For example, a DVD audio user is permitted to make only a certain number of copies. A user may reset these counters by merely saving and restoring some files on his hard disk. A user may also copy his protected files to some friend, and thereby duplicate content the original user has purchased. What is needed is a solution that solves these basic breaches of content protection.

The Java language presents a concept of "public" versus "private". Each method or subroutine is declared to be either public, private, or neither. The public methods were originally intended for the external interface of the Java application. Private methods were intended for all the functions within the Java application that may not be called externally. Methods that were neither public nor private were intended for use within a "package", a group of related Java classes.

However, large Java applications comprise many Java "packages", and consequently, almost every function has to be public. A hacker may exploit these public methods as "back doors", causing the application to behave in an unauthorized way. Even within a single package, the hacker can simply defeat package protection by merely adding his own class to the package. It is difficult for an application designer to verify that he or she has not inadvertently exposed some internal but "public" interface that a hacker may exploit. What is needed is a virtual machine language that prevents exposure of methods and functions, moving the issue of security from the application to the virtual machine language.

Recently, several hardware proposals have been made to help software store secrets and verify integrity. For example, the Trusted Computer Platform Alliance has defined an open standard for such hardware. Similar proprietary technology has also been developed. These approaches use an all-or-nothing aspect. For an application to be trusted, the operating system requires trust. For the operating system to be trusted, the operating kernel requires trust. For the operating kernel to be trusted, the original boot code requires trust. Even benign changes to any level break the chain of trust.

One solution defines a new privilege level in the operating system. In this privilege level resides a subset of the kernel, a subset of the operating system, and all trusted applications.

However, this proprietary approach gives the owner of this technology an enormous competitive advantage in building trusted applications, invalidating the concept of "open source". What is needed is a solution that allows the development of "open source" applications that can still effectively exploit special security hardware.

Many Java designers have expressed a desire that applications written for a specific user or device not be transportable to other users or devices. Java designers wish to sell the application to a single user without the user being able to give or sell that application to other users. What is needed is a solution that prevents sharing of applications without permission from the application designer or owner.

What is therefore needed is a system, a computer program product, and an associated method for a secure or the trusted Java virtual machine that is capable of supporting tamper resistant application software while preserving the concept of "open source". The need for such a solution has heretofore remained unsatisfied.

SUMMARY OF THE INVENTION

The present invention satisfies this need, and presents a system, a computer program product, and an associated method (collectively referred to herein as "the system" or "the present system") for a tamper-resistant trusted Java virtual machine. The trusted Java virtual machine provides a method for supporting tamper-resistant applications. The present system provides a method for ensuring the integrity of an application and its secrets, easing the process of writing open-source tamper-resistant software.

The trusted Java virtual machine implements tamper-resistance. It verifies the integrity of the application, prevents debugging of the application, and allows the application to securely store and retrieve secrets. The trusted Java virtual machine is not open-sourced. However, only one trusted Java virtual machine is required, which trusted Java virtual machine can support many different open-source applications. The value of "open source" is realized in the applications.

The present system requires a single trusted Java virtual machine, and the content protection logic is implemented in the trusted Java virtual machine. Traditional Java security works to prevent a Java applet or application downloaded from the Internet from damaging a user's computer. In contrast, the present system prevents an application from being damaged by the user, i.e., the application is protected from modification or exposure of secrets. The present system provides a trusted environment that the application knows is trusted and in which the application can operate.

Most content protection applications involve secret data (keys) as opposed to secret algorithms. The present system provides a way for applications to create and safely store these secrets. Some content protection schemes, such as watermarking schemes, also involve secret algorithms. The present system comprises strong cryptographic protection for the byte codes, if necessary.

The present system allows access by an application to the application's secrets such as keys. However, the application does not have access to secrets of other applications even if the two applications are running on the same machine.

In addition, the present system has a mechanism to guarantee that an application is intact. An intact, unmodified application has access to its secrets. If the present system determines that the application has been modified, the modified application no longer has access to its secrets. The present system does not define the secrets used by the applications. The application designers define those secrets.

The present system also provides a mechanism for protecting the programming code of an application by encrypting the programming code or virtual machine instructions. The present system has a media key block in the same file as the actual code. The Java virtual machine has a set of device keys that can be used to process the media key block to extract a media key. The media key is used to decrypt the programming code in that file. The programming code is never exposed in such a way that can be observed by a hacker. The programming code is only exposed when it is being loaded in memory or being executed by the Java virtual machine.

Some content protection schemes require a "secure counter". For example, a user is permitted to make only a certain number of copies of a DVD Audio. A user may attempt to reset his or her counters by merely saving and restoring some files on hard disk. A user may also attempt to copy his protected files to some friend, and thereby duplicate content the original user has purchased. The present system provides a method for solving these basic circumventions of content rights.

The present system comprises a TrustedDictionary, a TrustedBundle, an optional encryption method for encrypting and decrypting byte codes, and an underlying trusted Java virtual machine. The TrustedDictionary protects the data, while the TrustedBundle protects the programming code.

The TrustedDictionary is encrypted, allowing applications to store secret data and to secure counters. The use of the TrustedDictionary by an application implicitly verifies that the application is running in a trusted environment. The TrustedBundle allows the application designer to group together all of the Java packages that comprise the application, restricting access to only those interfaces that the application designer explicitly exports.

The TrustedBundle may optionally be encrypted, as required by the application. For example, the present system uses a Trusted Dictionary to protect secrets us by an application while allowing the programming code in the TrustedBundle to be open source. An open source code is not encrypted. However, the secrets required by the open source programming code of the application are encrypted in the TrustedDictionary.

The encryption method allows the application designer to encrypt those class files (sequences of byte codes) that are to remain secret. The encryption method also provides a renewable method for the present system to decrypt those class files while they are being executed. The trusted Java virtual machine wires-in implementations of the TrustedDictionary and the TrustedBundle. In other words, the implementations (or the important parts of it) are in "native" code for the given processor, not in the virtual machine byte codes. The trusted Java virtual machine is protected by standard software tamper-resistant techniques.

The TrustedDictionary and the TrustedBundle are related as follows: when an application instantiates a TrustedDictionary, the application implicitly lists those TrustedBundles that can "get" and "put" values from that TrustedDictionary. The application lists those TrustedBundles by listing the public keys that have been used to sign those TrustedBundles.

TrustedBundles may be Java archive (JAR) files, a standard method by which the class files for applications are packaged. The Java language allows the Java archive to be digitally signed by signing the Java archive manifest. The present system ensures that only applications from intact and correctly signed Java archive files are able to successfully use the TrustedDictionary. The Java archive files can use only TrustedDictionary that have been marked for their use.

The present system provides a mechanism by which an application can know that it is running in a trusted environment. An application designer instantiates a TrustedDictionary in an environment that is known to be trusted, such as his software manufacturing build machine. The application designer then deploys this TrustedDictionary along with the application. The application can only successfully extract the manufacturing secrets from the TrustedDictionary when it is operating in the trusted environment.

For example, a DVD Audio player application can be loaded at the factory with a TrustedDictionary that has a set of DVD Audio device keys. A DVD player application able to successfully play DVD Audio using those keys knows it is operating in a trusted environment. A hacker may attempt a "Trojan horse" environment that pretends to have a TrustedDictionary. However, any device keys obtained from such a "trusted dictionary" are unable to decrypt DVD Audio. Consequently, there is no exposure to that content protection scheme if the application were running in that false environment. The application designer knows that an application cannot perform an illegal operation if placed in a compromising environment.

As another example, a Digital Rights Management application uses public key protocols with a server to receive authorized content. Public key protocols are well known, and the protocols themselves are not secrets. The secrets are the private keys that correspond to the public keys in the protocol. The protocols may be placed in open source code as long as the private key remains hidden. If the private key of a client is put in a TrustedDictionary before the client application is deployed, the key can only be used in the trusted environment. If the client application and the server can successfully negotiate a public key protocol, they can be confident that the client application is running in the trusted environment. The server can safely deliver the authorized content as part of the protocol.

In another example, an application designer writes a program that provides audio watermarking for audio music. This audio watermark is a special copy control signal that instructs various audio players to behave in certain ways. The audio players respond to the audio watermark as instructed for copyright protection, preventing unauthorized used of the audio music. The programming code used by the audio players to detect and respond to the instructions in the audio watermark requires protection from hackers. The present system can encrypt this programming code and provide a secure and trusted environment in which this programming code can operate.

Application designers that chose to encrypt some or all of their class files have an additional method for verifying the application is operating in a trusted environment. Those class files cannot successfully load unless they are running in the trusted Java virtual machine. In this case, the application cannot run if it is not loaded in the trusted Java virtual machine environment.

The present system may, for example, be used to insure the integrity of a security camera recording a scene such as a bank lobby along with the time and the date. The bank and security firm depend on the integrity of the time and date on the picture. The present system can be used to provide a trusted environment for the security camera in which it is very difficult for an outsider to change the time and date.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

Figure 1:
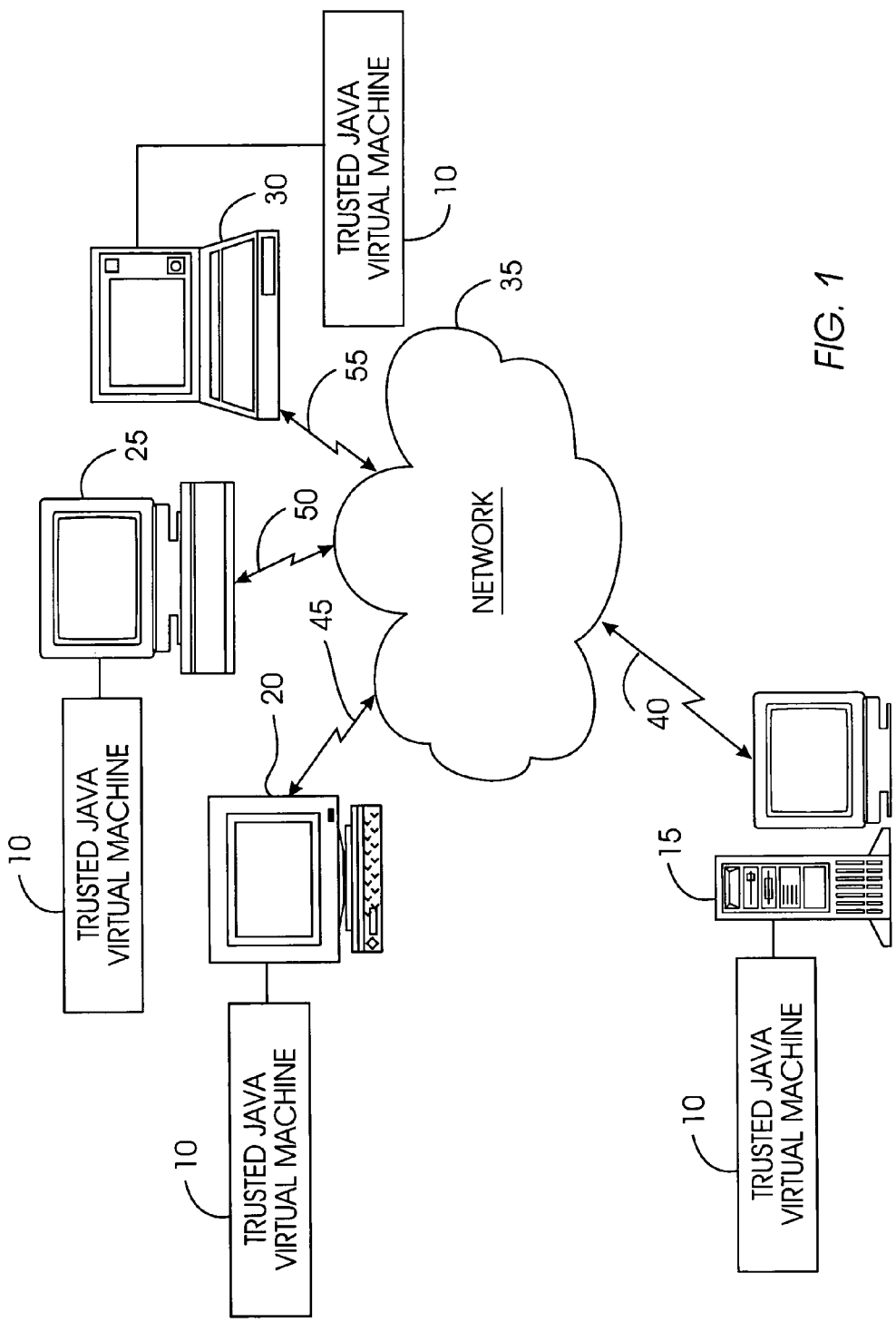
FIG. 1 is a schematic illustration of an exemplary operating environment in which a trusted Java virtual machine environment of the present invention can be used.

FIG. 1 portrays an exemplary overall environment in which a system and associated method for a trusted Java virtual machine according to the present invention may be used. The trusted java virtual machine 10 comprises a software programming code or a computer program product that is typically embedded within, or installed on a server 15. Alternatively, the trusted Java virtual machine 10 can be saved on a suitable storage medium such as a diskette, a CD, a hard drive, or like devices.

While the trusted Java virtual machine 10 is described in terms of the Java programming language, the present system may be implemented using any suitable type of virtual machines and "real" virtual machines. The use of the Java programming language in describing the trusted java virtual machine 10 is exemplary only, and does not limit the application of the present invention to other virtual machines.

Users, such as remote Internet users, are represented by a variety of computers such as computers 20, 25, 30, and can access the server 15 through a network 35. Computers 20, 25, 30 each comprise software that allows the user to interface securely with the server 15. The server 15 is connected to network 35 via a communications link 40 such as a telephone, cable, or satellite link.

Computers 20, 25, 30 are connected to network 35 via communications links 45, 50, 55, respectively. While the trusted java virtual machine 10 is described in terms of network 35, computers 20, 25, 30 may also access the trusted java virtual machine 10 locally rather than remotely. Computers 20, 25, 30 may access the trusted java virtual machine 10 either manually, or automatically through the use of an application.

Figure 2:
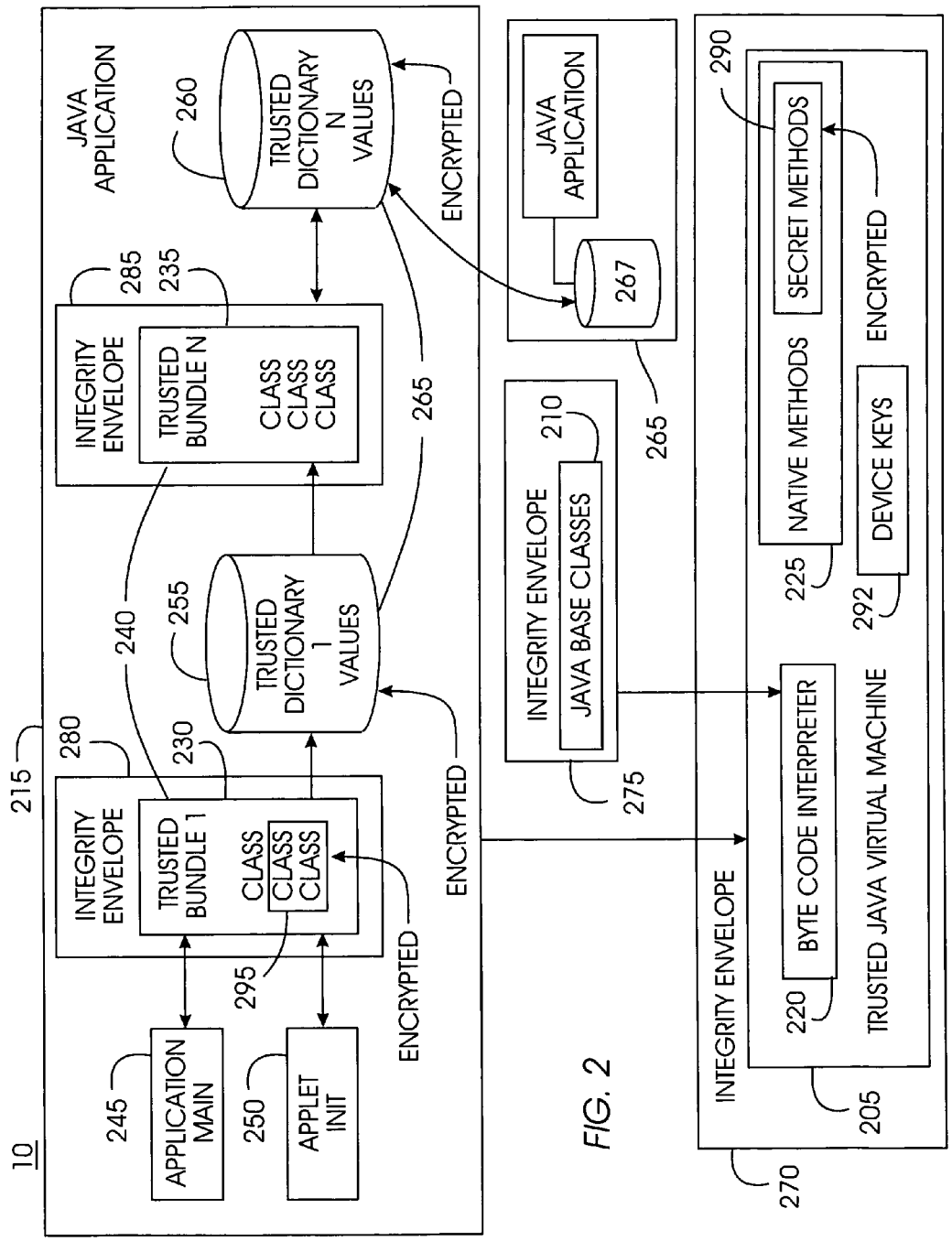
FIG. 2 is a block diagram of a high-level architecture of the trusted Java virtual machine environment of FIG. 1.

FIG. 2 illustrates a high-level hierarchy of the trusted java virtual machine 10. The trusted java virtual machine or TJVM 10 generally comprises a trusted java virtual machine 205, Java base classes 210, and Java applications 215.

The trusted java virtual machine 205 comprises routines that are typically written in a computer language, such as C, that is compiled into machine instructions for the particular computer on which the trusted java virtual machine is running. While the trusted java virtual machine 205 is described in terms of the C programming language, the present system may be implemented using any type of programming language. The use of the C programming language in describing the trusted java virtual machine 205 is exemplary only, and does not limit the application of the trusted java virtual machine 205 to other programming languages.

In standard Java implementations, the C code implements the byte code interpreter 220 and the "native" methods 225 that require interfacing with the operating system. The C code may be different on different platforms. In this example, the C code is implemented by the trusted Java Virtual Machine 205.

The Java base classes 210 are written in Java language and implement the fundamental Java objects: strings, objects, I/O, etc. They have been compiled into byte codes by the Java compiler. Some Java base classes may have methods that have been implemented in "native" code, that is, in the native instruction set of the processor on which they are executing.

The Java applications 215 run above the Java base classes 210. The Java application 215 comprises one or more TrustedBundles 1, 230, through TrustedBundles N, 235, that are collectively referenced as TrustedBundles 240. In addition, the application 215 comprises other Java codes that do not need to be trusted, such as application main 245 or applet init 250. The Java application 215 optionally comprises one or more TrustedDictionarys such as TrustedDictionary 1, 255, through TrustedDictionary N, 260, collectively referenced as TrustedDictionary 265.

The Java application 215 may comprise a plurality of TrustedBundles 240 and TrustedDictionary 265. Multiple TrustedBundles 240 can communicate with each other. TrustedBundles 240 can maintain secrets separately in TrustedDictionary 265 or share secrets in TrustedDictionary 265.

Different software companies may produce different Java applications 215, 266 that communicate and pass secrets via their respective TrustedDictionarys 265, 267. For example, a software company produces a Java application 215 for inserting a digital watermark in an audio CD. The digital watermark software comprises a TrustedBundle 240. The CD player comprises software in Java applications 266 that calls the watermarking TrustedBundle 240 to detect the watermark signal. TrustedDictionarys 265, 267 provide a secure path for the digital watermark software to communicate with the CD player software, securely verifying that they are authentic versions and not hacked versions of software.

Some modules are shown in FIG. 2 as being enveloped in "integrity envelopes". Integrity envelopes offer mechanisms to verify that these modules have not been modified. Trusted Java virtual machine 205 is protected by integrity envelope 270. Java base classes 210 are protected by integrity envelope 275. TrustedBundle 1, 230 is protected by integrity envelope 280. TrustedBundle N, 235 is protected by integrity envelope 285.

Integrity envelopes 270, 275, 280, 285 comprise the checking of digital signatures. In addition, integrity envelopes 270, 275, 280, 285 comprise other techniques, such as digital signets. For further details about digital signet techniques, reference is made, for example, to U.S. Pat. Nos. 5,978,482 and 6,038,316. Digital signets are similar to digital signatures, but have certain advantages in checking the integrity of software modules. Further, integrity envelopes 270, 275, 280, 285 comprise hardware-based integrity checks, such as those found in the Trusted Computing Platform Alliance (TCPA) and Palladium chips.

As illustrated in FIG. 2, secret methods 290 in the native methods 225 of the trusted Java virtual machine 205 may be encrypted. In addition, TrustedDictionary 265 may be encrypted. Further, some or all of the classes in TrustedBundles 240 may be encrypted, as illustrated by classes 295 in TrustedBundle 1, 230. At a minimum, the secret methods 290, TrustedDictionary 265, and classes 295 are encrypted while stored, for example in memory, on a disk, or an external memory.

Encryption may persist even after the secret methods 290, TrustedDictionary 265, and classes 295 have been loaded into the computer memory. In this case, the code for the secret methods 290, TrustedDictionary 265, and classes 295 may be decrypted "on the fly" immediately before execution. The secret methods 290, TrustedDictionary 265, and classes 295 may be logically encrypted after execution is complete.

The trusted Java virtual machine 10 uses known or available software tamper-resistance techniques. For further details about ciphers, reference is made, for example, to U.S. patent application Ser. No. 09/609,809, filed on Jul. 3, 2000, with which is incorporated herein by reference. In one embodiment, TrustedDictionary 265 is encrypted using standard ciphers such as Data Encryption Standard (DES) or Advanced Encryption Standard (AES).

The keys used to encrypt the secret methods 290 may be highly obfuscated global secrets, as is commonly used in the software tamper-resistance art. Known or available broadcast encryption techniques can be used to manage the keys used to encrypt the classes 295. For further details about broadcast encryption techniques, reference is made, for example, to U.S. Pat. No. 6,118,813 and U.S. patent application Ser. No. 2002/01147906A1. The trusted Java virtual machine 10 may use any suitable broadcast encryption schemes to encrypt the classes 295.

To use broadcast encryption, the designer of the trusted Java virtual machine 205 delivers media key blocks and their associated media keys to each application designer for encrypting Java classes, such as classes 295. The application designer uses a tool utilizing media keys to encrypt the specified classes 295. This tool adds the media key block to a Java archive file.

A set of device keys 292 is built into the trusted Java virtual machine 205. Each version of the trusted Java virtual machine 205 has a different set of device keys. To decrypt a given encrypted class 295, the trusted Java virtual machine 205 uses its device keys to process the media key block in the java archive file and extract the media key.

If hacking breaks a particular trusted Java virtual machine 205 and its set of device keys is revealed, a new trusted Java virtual machine 205 can be deployed with a new set of device keys. This new set of device keys can process all the media key blocks in all the existing applications.

Furthermore, new media key blocks can be given to application designers that exclude the compromised device keys while allowing uncompromised keys to function. The application designer may update his application to the new media key blocks at his convenience. Updates of media key blocks do not have to tightly synchronize with the deployment of a new trusted Java virtual machine 205.

The platform on which the trusted Java virtual machine 205 is running may comprise security chips such as, for example, TCPA chips or Palladium chips. If so, these chips can be used to store the device keys.

In one embodiment, the TrustedDictionary 265 comprises a subclass of the standard Java base class Dictionary. Any suitable class that allows the storing and retrieving of data values may be used as a TrustedDictionary 265. The methods of the TrustedDictionary 265 (e.g., "get" and "put") are implemented as native methods 225 in the trusted Java virtual machine 205.

If TrustedDictionary 265 does not allow copying it is defined as "localized". If Java application 215 specifies that TrustedDictionary 265 is localized, then Java application 215 cannot read TrustedDictionary 265 on another computer system.

Known or available logic techniques comprising "key databases" and a level of indirection in the key calculation can be used to create the TrustedDictionary 265. For further details about the basic logic of the TrustedDictionary 265, reference is made, for example, to U.S. patent application Ser. No. 09/754,396, filed on Jan. 5, 2001, with which is incorporated herein by reference.

Java dictionaries typically have "keys" and "values". However, to avoid confusing dictionary keys with encryption keys, we will use the term "keyword" instead of "key" for the former concept. Thus, the dictionary values are stored associated with keywords, and they are later retrieved by using the keyword. In the TrustedDictionary 265, the keywords and values are encrypted with a secret key, called the database master key. The database master key is the result of a secret function of the following types of values: generic values, platform-specific values, and read-write values. A platform-specific value may be, for example, the serial number of the hard disk on a user's computer.

An exemplary read-write value may be values stored in the basic input/output system (BIOS) read/write area of the computer. For the purposes of integrity, the read/write values cannot be easily saved and restored by the end-user. In platforms with TCPA or Palladium chips, platform values and read/write capability are built into the chips.

As an example, a "key database" may be used for the TrustedDictionary 265. If the key database is moved from one PC to another, the program no longer calculates the correct master key for the database and the database is useless. The key database may comprise counters. The user may attempt to save and restore a key database to reset a counter. The read/write values change between the save and the restore, changing the master key. Consequently, the key database and the TrustedDictionary 265 are no longer usable. The Java application 215 now knows that the user attempted to circumvent usage rules and can respond appropriately.

Some Java applications 215 do not need platform binding or save/restore protection. It is a relatively simple matter to make the platform binding or the save/restore protection a configuration parameter of the dictionary and omit including platform-specific values or read/write values in the secret master key function as needed.

TrustedDictionary 265 comprises a list of public keys provided when TrustedDictionary 265 is created. These public keys limit TrustedDictionary 265 access to TrustedBundles 240 whose Java archive files were signed by a private key associated with one of the public keys.

In one embodiment, the TrustedDictionary 265 implementation checks the list of public keys before accessing the TrustedDictionary 265 on behalf of a TrustedBundle 240. Another embodiment takes advantage of a built-in "secret function" master key mechanism, using the public key as one of the generic values input to the secret function. The bundle may then successfully decrypt the TrustedDictionary 265 as allowed.

If more than one public key is associated with the TrustedDictionary 265, a level of indirection may be added to the key calculation. Each of the various master keys, one for each public key, encrypts a common intermediate key. The intermediate key encrypts the values in the TrustedDictionary 265.

In addition, the different encrypted versions of the intermediate key are stored in the TrustedDictionary 265. When a TrustedBundle 240 tries to access to a TrustedDictionary 265, the trusted Java virtual machine 205 calculates a master key and decrypts each one of those encrypted versions of the intermediate key. If the bundle is allowed to access this TrustedDictionary 265, one of those decryptions is the true intermediate key. This true intermediate key allows access.

The values for keywords in the trusted Dictionary may be almost any Java object. In the Java language, for example, most Java objects can be turned into a sequence of bytes using the writeObject( ) method. Such objects are called "serializable". That sequence of bytes can be treated as a dictionary keyword or value. Consequently, any serializable Java object can be safely stored in a TrustedDictionary 265.

In one embodiment, the TrustedBundle 240 is a subclass of the Bundle class of the Open Service Gateway Initiative (OSGi). Any concept that can restrict access to most of the public methods of an application may be a TrustedBundle 240.

A feature of Java is used to "hide" an entire class, not just its private methods, from anyone outside of the bundle. For example, two classes such as Class X and Class Y are loaded by different class loaders, ClassLoader A and ClassLoader B. Both the name of the class and the actual class loader are important to identify the class to the Java virtual machine.

Unless ClassLoader A and ClassLoader B take special measures to communicate with each other, even classes that have the same name are duplicated and separately brought in by each class loader. Consequently, two identical classes with the same name are viewed as different classes by the trusted Java virtual machine 205. For example, if Class X generates a Widget object and passes it to a method of Class Y, a ClassCastException error occurs because Class X generated an A Widget and Class Y expected a B Widget, even though the class file that implements Widget is the same.

In one embodiment, this Java feature of hiding an entire class is implemented in an OSGi Bundle concept. Each bundle is a separate java archive file that is deliberately loaded by a separate class loader. This class loader communicates with the other class loaders in the system to obtain the Java base classes 210 and to export packages (groups of classes) that are specifically designated as "export" packages in the manifest of the java archive file. Only the exported classes can be successfully referenced by other bundles or by code that is outside of the bundles.

To make an OSGi Bundle a TrustedBundle 240, the trusted Java virtual machine 10 requires that the Java archive manifest of an OSGi Bundle be signed. Consequently, only the packages designated by the original signer can be exported.

In one embodiment, the trusted Java virtual machine 10 makes getClassLoader( ) a private method; this prevents hackers from using getClassLoader( ) to circumvent the intention of the application designer in protecting, for example, property rights of media. The method getClassLoader( ) is made private because of the following feature of OSGi Bundles. The class of any Java object can be obtained by using the "getClass( )" method on that object. The result is a class object that has a public method called getClassLoader( ). GetClassLoader( ) returns the ClassLoader object of the class loader that loaded the class. From the ClassLoader object, the method loadClass( ) can be used to find the class object of any other class loaded by the class loader. From the class object, new objects of that class can be instantiated. This defeats the intention to only allow exported classes to be instantiated outside of the TrustedBundle 240.

In another embodiment, the behavior of the "getClassLoader( )" is modified so that it is cognizant of the TrustedBundle 240. Consequently, getClassLoader( ) returns a useful class loader only to methods that are within the same TrustedBundle 240. A further embodiment utilizes a Java Security Manager to restrict objects performing "getClassLoader( )". Yet another embodiment modifies the bundle class loader so that it only reveals exported classes when called outside of the TrustedBundle 240.

The Java base classes 210 are encapsulated in an integrity envelope because the Java base classes 210 are common to all TrustedBundles 240. Otherwise, it is theoretically possible to have a Trojan horse disguised as a Java base class 210. For example, if a TrustedBundle 240 were to convert a key to a string, a bogus string class may write the result on hard disk. While this attack is somewhat far-fetched, it is a simple matter to eliminate it just by checking the Java base classes 210.

The trusted Java virtual machine 10 utilizes a "secure authenticated channel". The term "secure authenticated channel" is a standard term in software tamper-resistance. It refers to a connection between two independent software modules that need to communicate with each other without allowing a man-in-the-middle to siphon off the data being passed.

The secure authenticated channel can be conveniently established in the trusted Java virtual machine 10 by having TrustedBundles 240 share a trustedDictionary 265. In other words, the calling TrustedBundle 240 calls an exported class in the callee TrustedBundle 240, passing a TrustedDictionary 265 that was instantiated with public keys from both the caller and callee TrustedBundles 240. By prearrangement, certain named values that act as arguments to the callee TrustedBundle 240 are stored in the TrustedDictionary 265. Likewise, the callee TrustedBundle 240 returns values by storing them in the TrustedDictionary 265 in prearranged names. The trusted Java virtual machine 10 returns secret values such as keys in this manner to prevent observation or modification by a man-in-the-middle program.

This secure authenticated channel approach does not prove to the TrustedBundles 240 that they are running in a trusted environment. Consequently, TrustedBundles 240 verify that they are in the trusted environment using the methods described above before trusting this mechanism. In addition, the party that did not instantiate the TrustedDictionary 265 verifies that its public keys are as expected. In an embodiment, the class of TrustedDictionary 265 implements a getPublicKeys( ) method to verify public keys. The trusted Java virtual machine 10 may utilize any of a multitude of methods to verify the public keys.

In one embodiment, the trusted Java virtual machine environment utilizes security chips such as, for example, TCPA and Palladium chips, without affecting the Java applications 215. The trusted Java virtual machine 205 is normally loaded as part of the chain of trust that begins with the basic input/out system (BIOS) loader. If the chain of trust is lost, the trusted Java virtual machine 205 can no longer trust that the operating system is secure.

However, this is the normal state for software tamper-resistance and there are well-known techniques to compensate. For example, critical parts of the operating system may have software integrity envelopes. Alternatively, techniques similar to those used in virus detection can be deployed to detect circumvention programs that the user has installed in his operating system kernel. Many circumvention programs are designed to work at the kernel level.

In situations where the operating system is untrusted, the trusted Java virtual machine 205 uses standard software tamper-resistance techniques to detect circumvention programs in the operating system. The trusted Java virtual machine 205 uses security chips to store device keys and values for calculations of the TrustedDictionary 265.

In normal operation, values in the security chips are protected by the checksum of the Java applications 215. However, these checksums are not secret, they are performed by the immediately underlying layer in the chain of trust. Once the chain of trust has been broken, these values act as secret keys; the keys no longer need to be checksums. In an embodiment, the value that unlocks the stored values of the trusted Java virtual machine 205 is the result of an integrity calculation, for example, a digital signet calculation.

Figure 3:
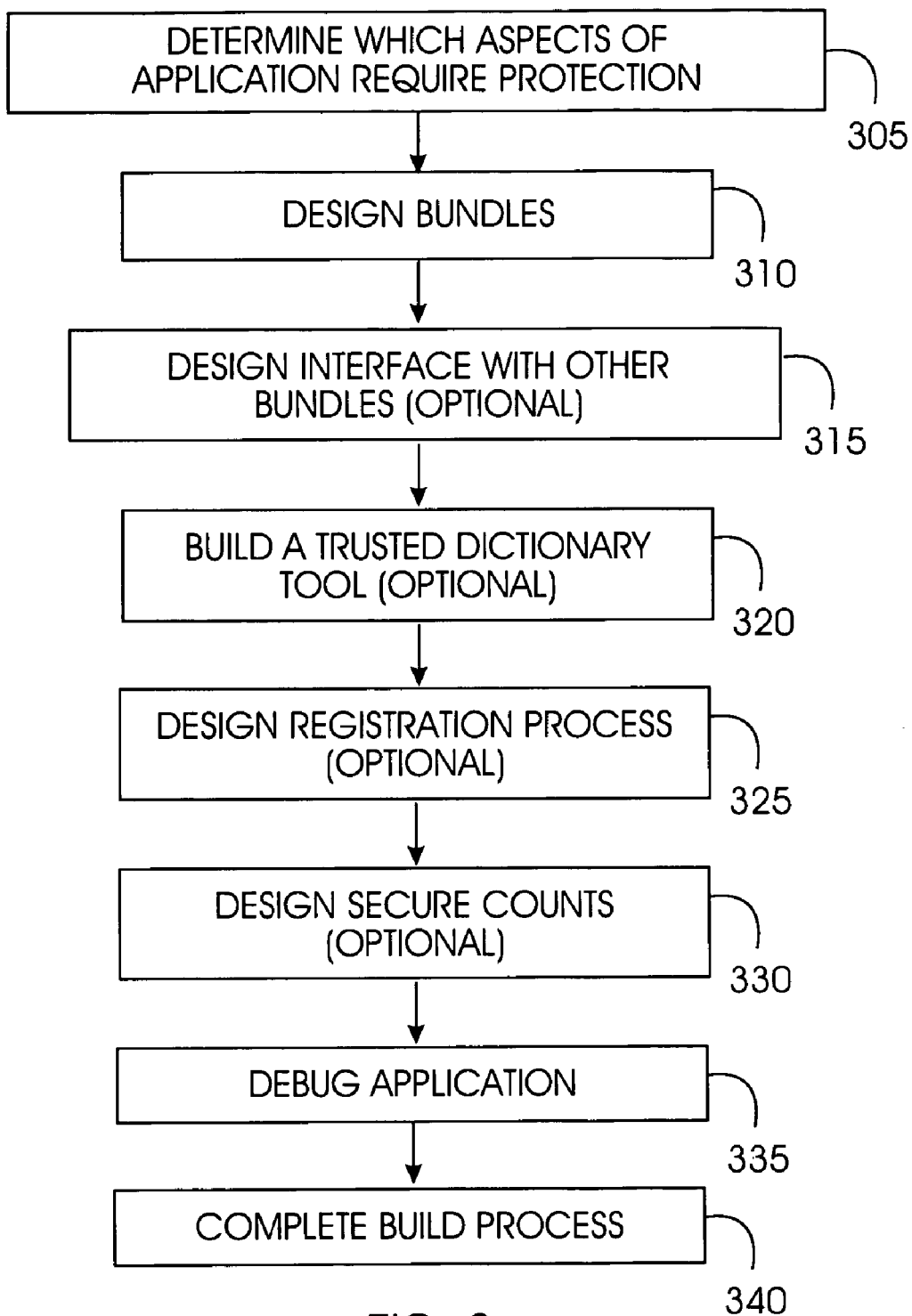
FIG. 3 is a process flow chart illustrating a method of created an application for use in the trusted Java virtual machine environment of FIGS. 1 and 2.

A method 300 for creating a trusted Java application 215 that uses the trusted Java virtual machine 10 is illustrated by the process flow chart of FIG. 3. At step 305, the application designer determines which aspects of the Java application 215 require protection. The Java application 215 may comprise a secret code, secret data, or a combination of the two. For example, a DVD Video content protection scheme (CSS) has secret keys. CSS also requires licensees to protect the encryption algorithm. On the other hand, a DVD Audio protection scheme (CPPM) comprises secret keys only; the algorithms are publicly described.

If the Java application 215 comprises secret data, the Java application 215 is designed to locate the secret data in Java dictionaries. The Java dictionaries are instantiated as TrustedDictionary 265 when the Java application 215 is deployed.

The bundles of the Java application 215 are designed at step 310. In one embodiment, these bundles are designed as Open Service Gateway Initiative bundles. The application designer signs the Java archive file that corresponds to the bundle; this ensures that the bundle is treated as a TrustedBundle 240. The application designer provides a list of public keys when a TrustedDictionary 265 is instantiated. Only bundles that are signed by the associated private keys are allowed to access that TrustedDictionary 265.

At step 305, the application designer may determine the Java application 215 comprises no secrets. For example, an MPEG rendering application needs no secret information to perform its function. For example, the application designer may create an application that is intended as a subroutine by another content protection scheme. In this case, that content protection scheme trusts that the subroutine is rendering only and not saving the data in a file. In this case, the application designer follows optional step 315, "design interface with other bundles".

At step 315, a public interface that can be called from any application or service (trusted or untrusted) can be made available as a normal OSGi service with any interface that is appropriate. If the service requires interface with a TrustedBundle 240, the interface to the TrustedBundle 240 requires a TrustedDictionary 265.

For example, the interface to the TrustedBundle 240 may be between a caller and a "callee". If the service is the caller in the interface with the TrustedBundle 240, the service uses a TrustedDictionary 265. If the service is not the caller, the application designer instantiates a TrustedDictionary 265 with the pubic key of the service and the pubic public key of the callee. These public keys are saved in a private TrustedDictionary 265 to ensure tamper-resistance.

If the service is the callee, then the caller has instantiated the TrustedDictionary 265. When the TrustedDictionary 265 is passed to the service, the service verifies the TrustedDictionary 265 was built with the expected public keys. A rendering application with no secrets that performs its function for any caller does not require confirmation of the TrustedDictionary 265.

Secret arguments and return values are passed through the TrustedDictionary 265 to prevent man-in-the-middle attacks. TrustedDictionary 265 may comprise any serializable Java object. An "init" method may return an object to the service caller through the TrustedDictionary 265. Normal arguments and return values may then be used with the methods in that initial object. This initial object may be an instance of an exported class. If the application designer is using this optimization, only interfaces and abstract classes may be in the export package.

At step 320, the application designer optionally builds a TrustedDictionary Tool. The application designer provisions any secret data used by an application into a TrustedDictionary 265 in a known trusted environment, such as the environment where the Java application 215 is created.

Allowing the end-user to instantiate the TrustedDictionary 265 on the user's machine during installation does not guarantee the required trusted environment. The application designer builds a tool to instantiate a TrustedDictionary 265, provisions that tool with the necessary secrets, and serializes that tool into a file using standard ObjectOutputStream methods.

A TrustedDictionary 265 that is serialized can be deployed as part of the Java archive file of the Java application 215, for example. A serialized TrustedDictionary 265 is only readable or writeable by the trusted Java virtual machine 205.

The application designer optionally designs a registration process for the Java application 215 at step 325. If a given instance of the Java application 215 is to remain bound to a single platform, the invocation of the BundleActivator class's start( ) method reads the private TrustedDictionary 265, executes setLocal( ) on the private TrustedDictionary 265, and writes the private TrustedDictionary 265 back into the file system.

For added protection, the application designer may combine step 325 with a connection to an external registration service. The private TrustedDictionary 265 that is deployed with the application may have IDs and secrets for the initial connection. Subsequent secrets can be delivered as part of the registration after the TrustedDictionary 265 has been localized.

The application designer optionally designs secure counts at step 330. A java application 215 may require secure counts during operation. Secure counts that cannot be easily reset by a user when saving and restoring files on a hard disk are stored in a Trusted Dictionary 265. The invocation of the start( ) method of a BundleActivator class reads the private TrustedDictionary 265 and executes preventNormalRestore( ) on the private TrustedDictionary 265. The BundleActivator class then writes the private TrustedDictionary 265 back into the file system using the writeObject( ) method of the ObjectOutputStream. The TrustedDictionary 265 is now in the irreversible state, meaning that an end-user cannot easily change it to a previous state by simply replacing its file with an older version.

Each time a secure count is incremented in the TrustedDictionary 265 dictionary, the secure count is written back into the file system. The Java application 215 then executes commit( ) on the TrustedDictionary 265, preventing inadvertent corruption of the TrustedDictionary 265 due to an inopportune system crash. Without commit( ), the user may restore the TrustedDictionary 265 back to the previous commit( ) point. Any commit on any dictionary, commits them all. Therefore, all dictionaries can be committed with a singe invocation while updating multiple dictionaries in a sequence. However, the trusted Java virtual machine 205 can restore TrustedDictionary 265 even if it has been marked irreversible.

The application designer debugs the Java application 215 at step 335. A debug version of a TrustedDictionary 265 can run on any Java virtual machine. Based on the system property trustedDictionary.keyVerify being either "true" or "false", the debug class may or may not enforce appropriately signed Java archive files. The debug version of a TrustedDictionary 265 enforces the "Serializable" behavior of a TrustedDictionary 265: i.e., all objects in the TrustedDictionary 265 are serializable and the "get" method returns a duplicate of the original object rather than the original object itself.

The debug version of a TrustedDictionary 265 is not readable in the trusted Java virtual machine 205. The trusted Java virtual machine 205 does not support debug of any kind.

The application designer completes the build process of the Java application 215 at step 340. Optionally, if the designer is encrypting one or more classes, a media key block may be obtained. This media key block is customized to the public key of the Java archive file.

A Java archive signer (jarsigner) is used to sign the Java archive file. No classes are added to the Java archive file after it is signed. However, data or other resources may be added to the Java archive file after it is signed. TrustedDictionary 265 are self-authenticating; consequently, signing TrustedDictionary 265 in the Java archive file is not generally required.

Figure 4A:
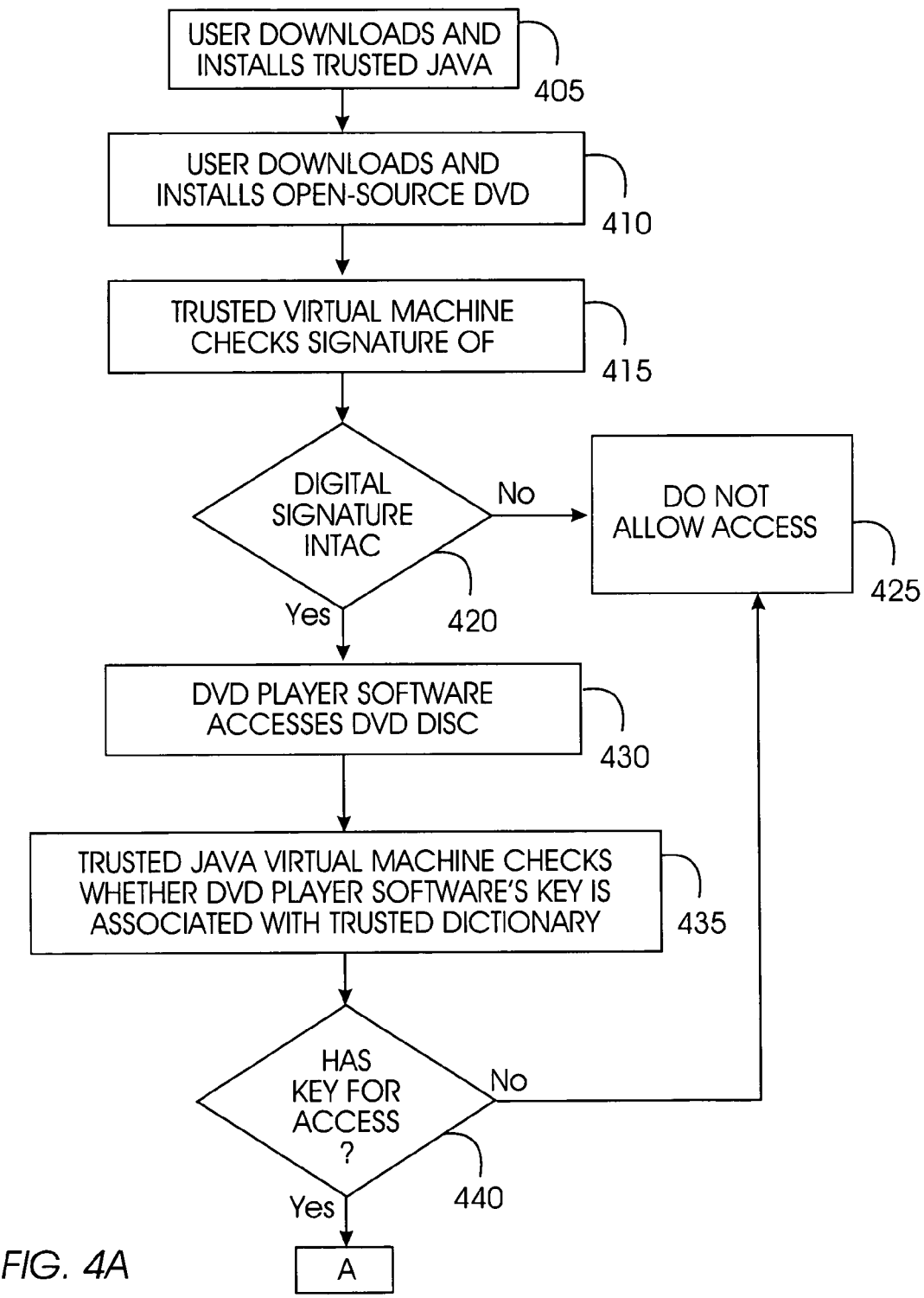
FIG. 4 is comprised of FIGS. 4A and 4B, and represents a process flow chart illustrating a method of operation of an exemplary application in the trusted Java virtual machine environment of FIGS. 1 and 2.
Figure 4B:
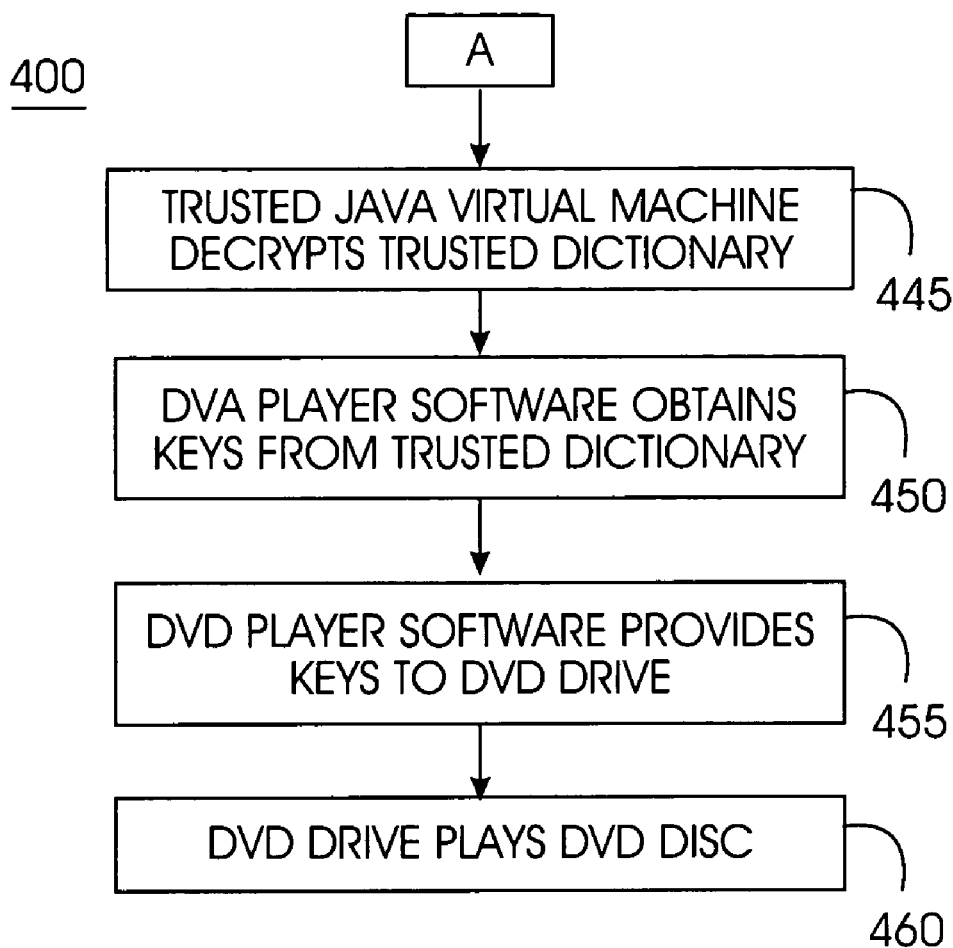

The interaction between a DVD player application and a DVD disc in the trusted Java virtual machine 10 is illustrated by method 400 of the process flow chart of FIG. 4 (FIGS. 4A, 4B). A user has a DVD drive and wishes to operate the DVD drive with open source DVD player software. The DVD drive is the mechanism that operates the DVD disc. The user downloads the trusted Java virtual machine 205 at step 405 and installs it on his DVD device. The DVD device comprises the DVD drive and sufficient computing capability to operate the trusted Java virtual machine 205 and the DVD drive.

At step 410, the user downloads and installs the DVD player software. The DVD player software comprises open source codes in one or more TrustedBundles 240 and secrets such as keys and IDs in one or more TrustedDictionary 265. The trusted Java virtual machine 205 checks the digital signature of the of the TrustedBundle 240 of the DVD player software to make sure the TrustedBundle 240 has not been modified since it was created (step 415). If the digital signature is not intact (decision step 420) the trusted Java virtual machine 205 does not allow access to the TrustedDictionary 265 at step 425.

The DVD player software accesses the DVD disc on the DVD drive at step 430. The DVD disc requires certain device keys to authorize disc play; these keys are stored in the TrustedDictionary 265. Access to the TrustedDictionary 265 requires an intact signature signed by the correct key. The trusted Java virtual machine 205 verifies that the DVD player software has the appropriate keys to access the TrustedDictionary 265 at step 435. If the DVD player software does not have the appropriate keys for access (decision step 440), the trusted Java virtual machine 205 does not allow access to the TrustedDictionary 265 (step 425).

If the DVD player has the appropriate keys for access at decision step 440, the DVD player software is verified as intact and authentic. The DVD player software now has access to the TrustedDictionary 265. The trusted Java virtual machine 205 decrypts TrustedDictionary 265 at step 445. The DVD player software obtains one or more keys, e.g., a device key, from TrustedDictionary 265 at step 450 and provides keys as necessary to the DVD driver at step 455. The DVD driver then plays the DVD disc at step 460. The DVD player software, the DVD disc, and the DVD device may all be created by different manufacturers. However, they all work together to ensure content protection in the trusted Java virtual machine 10.

In an attempt to use a Java application 215 in an unauthorized manner, the Java application 215 may be loaded into a conventional Java virtual machine, one that does not provide a trusted environment. In normal operation, the Java application 215 attempts to access the TrustedDictionary 265, requesting keys for performing tasks such as playing a DVD disc. However, the conventional Java virtual machine cannot decrypt the TrustedDictionary 265. Consequently the Java application 215 cannot obtain the keys required for continued operation. Even though the Java application 215 is open source software operating in a conventional Java virtual machine, operations and information that are not allowed by the designer of the Java application 215 cannot occur without the correct keys.

It is to be understood that the specific embodiments of the invention that have been described are merely illustrative of certain applications of the principle of the present invention. Numerous modifications may be made to a tamper-resistant trusted Java virtual machine and method of using the same described herein without departing from the spirit and scope of the present invention.

What is claimed is:

1. A method for running a tamper-resistant application in a trusted environment, comprising:
    defining a trusted virtual machine environment that contains a trusted dictionary for protecting data,
    wherein the trusted dictionary having an associated secure count, comprises a subclass of a standard base class dictionary using any class that allows a storing and a retrieving of data values, wherein the trusted dictionary contains keywords and values encrypted with a secret including a key, and wherein the trusted dictionary includes a list of public keys,
    wherein each time the secure count is incremented during operation of the application, the trusted dictionary is placed into an irreversible state, such that the trusted dictionary cannot be placed into a pervious state by replacing a file associated with the trusted dictionary with an older version of the file;
    verifying the integrity of the application;
    wherein, if the application is tampered with, the trusted virtual machine environment prevents the application from accessing the secret in the trusted dictionary, and further prevents changing of the trusted dictionary to the previous state, thus disabling the normal operation of the application.

2. The method of claim 1, wherein if the integrity of the application is confirmed, the trusted virtual machine environment allows the application to access the secret in the trusted dictionary, thus enabling the normal operation of the application.

3. The method of claim 2, wherein defining the trusted virtual machine environment comprises defining a trusted bundle for protecting a programming code of the application.

4. The method of claim 3, wherein protecting the programming code comprises encrypting the programming code.

5. The method of claim 4, wherein the trusted virtual machine environment decrypts the encrypted programming code using a decryption key from a media key block associated with the application.

6. The method of claim 1, wherein defining the trusted virtual machine environment comprises using a security chip.

7. The method of claim 3, wherein defining the trusted bundle comprises restricting access to instruction codes of the trusted bundle.

8. The method of claim 1, further comprising encrypting the trusted dictionary.

9. The method of claim 1, wherein defining the trusted virtual machine environment comprises defining at least two trusted bundles; and
    wherein the trusted dictionary is shared between at least some of the at least two trusted bundles, to maintain communication integrity between the at least two trusted bundles.

10. The method of claim 1, wherein the application comprises a player that plays copy-protected media.

11. The method of claim 10, wherein the trusted dictionary contains one or more decryption keys to decrypt the copy-protected media.

12. A computer program product having instruction codes stored on storage medium for running a tamper-resistant application in a trusted environment, comprising:
    a first set of instruction codes for defining a trusted virtual machine environment that contains a trusted dictionary for protecting data,
    wherein the trusted dictionary having an associated secure count, comprises a subclass of a standard base class dictionary using any class that allows a storing and a retrieving of data values, wherein the trusted dictionary contains keywords and values encrypted with a secret including a key, and wherein the trusted dictionary includes a list of public keys,
    wherein each time the secure count is incremented during operation of the application, the trusted dictionary is placed into an irreversible state, such that the trusted dictionary cannot be placed into a pervious state by replacing a file associated with the trusted dictionary with an older version of the file;
    a second set of instruction codes for verifying the integrity of the application;
    wherein, if the application is tampered with, the trusted virtual machine environment prevents the application from accessing the secret in the trusted dictionary, and further prevents changing of the trusted dictionary to the previous state, thus disabling the normal operation of the application.

13. The computer program product of claim 12, wherein if the integrity of the application is confirmed, the trusted virtual machine environment allows the application to access the secret in the trusted dictionary, thus enabling the normal operation of the application.

14. The computer program product of claim 13, wherein the first set of instruction codes defines the trusted virtual machine environment by defining a trusted bundle for protecting a programming code of the application.

15. The computer program product of claim 14, wherein the first set of instruction codes protects the programming code by encrypting the programming code.

16. The computer program product of claim 15, wherein the trusted virtual machine environment decrypts the encrypted programming code using a decryption key from a media key block associated with the application.

17. The computer program product of claim 12, wherein the first set of instruction codes defines the trusted virtual machine environment comprises using a security chip.

18. The computer program product of claim 14, wherein the first set of instruction codes defines the trusted bundle by restricting access to the trusted bundle.

19. The computer program product of claim 12, further comprising a third set of instruction codes for encrypting the trusted dictionary.

20. The computer program product of claim 12, wherein the first set of instruction codes defines the trusted virtual machine environment by defining at least two trusted bundles; and wherein the trusted dictionary is shared between at least some of the at least two trusted bundles, to maintain communication integrity between the at least two trusted bundles.

21. The computer program product of claim 12, wherein the application comprises a player that plays copy-protected media.

22. The computer program product of claim 21, wherein the trusted dictionary contains one or more decryption keys to decrypt the copy-protected media.

23. A system for running a tamper-resistant application in a trusted environment, comprising:

a storage medium for storing a definition of a trusted virtual machine environment that contains a trusted dictionary for protecting data, wherein the trusted dictionary having an associated secure count, comprises a subclass of a standard base class dictionary using any class that allows a storing and a retrieving of data values, wherein the trusted dictionary contains keywords and values encrypted with a secret including a key, and wherein the trusted dictionary includes a list of public keys, wherein each time the secure count is incremented during operation of the application, the trusted dictionary is placed into an irreversible state, such that the trusted dictionary cannot be placed into a pervious state by replacing a file associated with the trusted dictionary with an older version of the file;

a server, operatively coupled to the storage medium, for performing a verification of the integrity of the application;

wherein, if the application is tampered with, the trusted virtual machine environment prevents the application from accessing secrets in the trusted dictionary, and further prevents changing of the trusted dictionary to the previous state, thus disabling the normal operation of the application.

24. The system of claim 23, wherein if the integrity of the application is confirmed, the trusted virtual machine environment allows the application to access the secrets in the trusted dictionary, thus enabling the normal operation of the application.

25. The system of claim 24, wherein the definition of the trusted virtual machine environment comprises a definition of a trusted bundle for protecting a programming code of the application.

26. The system of claim 25, wherein the protection of the programming code comprises an encryption of the programming code.

27. The system of claim 26, wherein the trusted virtual machine environment decrypts the encrypted programming code using a decryption key from a media key block associated with the application.

28. The system of claim 23, wherein the definition of the trusted virtual machine environment comprises the use of a security chip.

29. The system of claim 25, wherein the definition of the trusted bundle comprises a restriction of access to instruction codes of the trusted bundle.

30. The system of claim 23, further comprising an encryption of the trusted dictionary.

31. The system of claim 23, wherein the definition of the trusted virtual machine environment comprises a definition of at least two trusted bundles; and wherein the trusted dictionary is shared between at least some of the at least two trusted bundles, to maintain communication integrity between the shared trusted dictionary.

32. The system of claim 23, wherein the application comprises a player that plays copy-protected media.

33. The system of claim 32, wherein the trusted dictionary contains one or more decryption keys to decrypt the copy-protected media.

* * * * *